United States Patent [19]
Szita et al.

[11] Patent Number: 5,449,248
[45] Date of Patent: Sep. 12, 1995

[54] SEALING DEVICE FOR EXPANSION JOINTS OF CONCRETE DAMS AND METHOD FOR INSTALLING SAME

[75] Inventors: Peter Szita, Ste-Thérèse; Louis Dubreuil, Montréal-Nord, both of Canada

[73] Assignee: Hydro-Quebec, Montreal, Canada

[21] Appl. No.: 31,465

[22] Filed: Mar. 15, 1993

[30] Foreign Application Priority Data

Mar. 30, 1992 [CA] Canada .................. 20644290

[51] Int. Cl.⁶ .................. E02B 7/08; E02B 3/16
[52] U.S. Cl. .................. 405/116; 405/107
[58] Field of Search .............. 405/107, 108, 114, 116, 405/152, 267

[56] References Cited

U.S. PATENT DOCUMENTS

| | | | |
|---|---|---|---|
| 1,628,933 | 5/1927 | Troiel | 405/114 X |
| 1,719,003 | 7/1929 | Downing . | |
| 2,341,322 | 2/1944 | Hubbell . | |
| 2,368,511 | 1/1945 | Zimmerman . | |
| 3,342,033 | 9/1967 | Crouch . | |
| 4,268,192 | 5/1981 | Colle | 405/267 X |
| 4,655,638 | 4/1987 | Waring . | |

FOREIGN PATENT DOCUMENTS

| | | |
|---|---|---|
| 456875 | 3/1974 | Australia . |
| 22446 | 7/1921 | France . |
| 1429417 | 1/1966 | France . |
| 2312605 | 12/1976 | France . |
| 365022 | 3/1974 | Sweden . |
| 424850 | 5/1967 | Switzerland . |

OTHER PUBLICATIONS

Patent Abstracts of Japan, vol. 10, No. 381 (M-547)(2438) Dec. 19, 1986 & JP-A-61 172 907 (Bridgestone) Aug. 4, 1986, Abstract.

*Primary Examiner*—David H. Corbin
*Attorney, Agent, or Firm*—Foley & Lardner

[57] ABSTRACT

A sealing device for sealing an expansion joint cut in a concrete dam comprises a tubular cell made of an elastic material and provided at its upper and lower ends respectively with a rigid upper ferrule and a rigid and rounded lower ferrule. Cables are mounted between the upper and lower ferrules for preventing the longitudinal stretching of the cell. The cell includes two longitudinal reinforcements spaced one from another and disposed opposite the cut for preventing the radial deformation of the cell in the cut. A continuous peripheral space is defined on the cell between the lower ends of the reinforcements and the upper end of the lower ferrule to allow the cell to form a continuous peripheral seal against the walls of a hole bored along the expansion joint. A method for the installation of the expansion joint in the concrete dam using the sealing device is also proposed, wherein the sealing device is installed in a hole bored on the expansion joint, the reinforcements being positioned in the direction of the water flow. The cell is then filled and pressurized with appropriate fluids. The expansion joint is obtained by the completion of the cut.

43 Claims, 8 Drawing Sheets

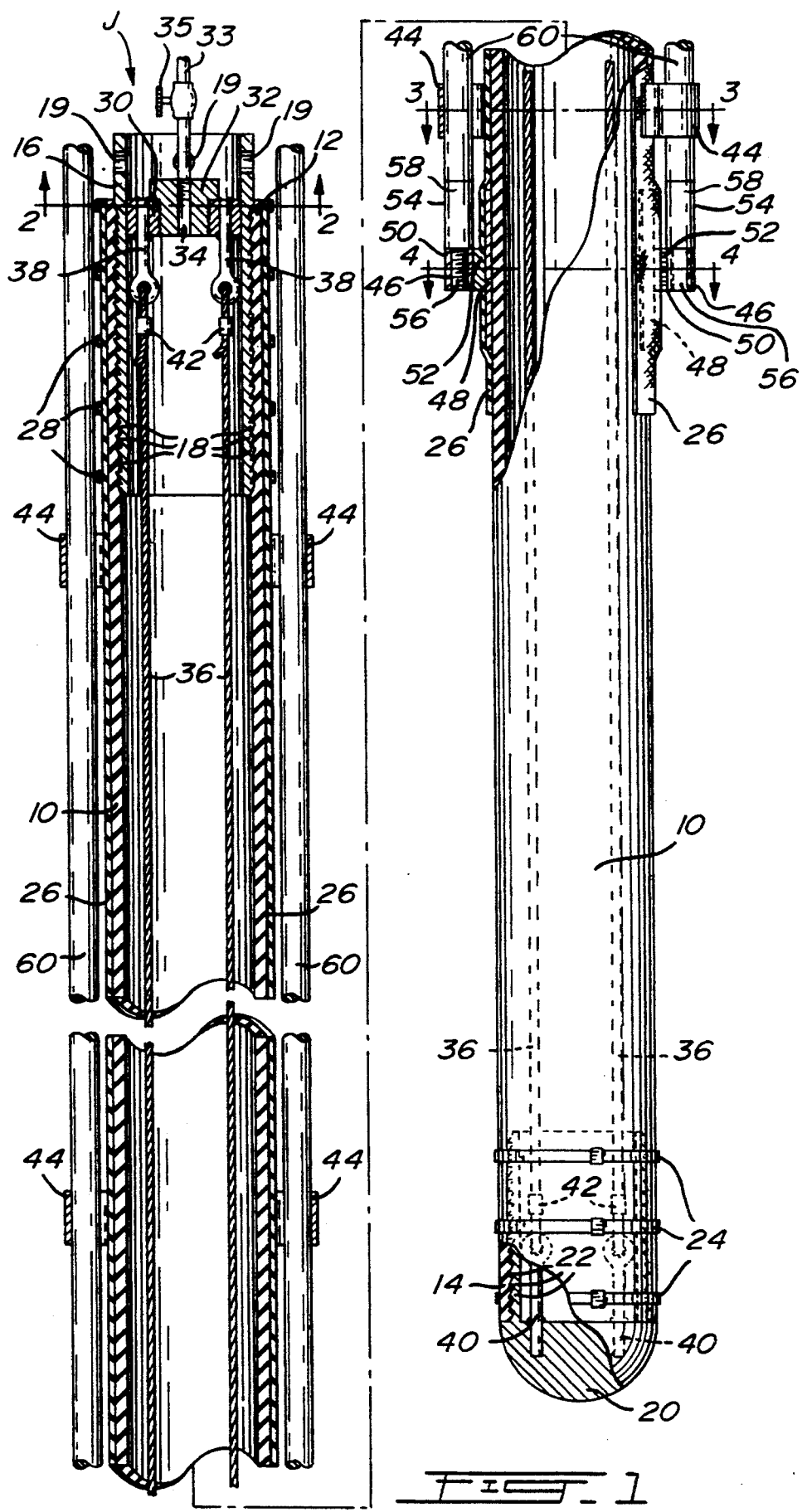

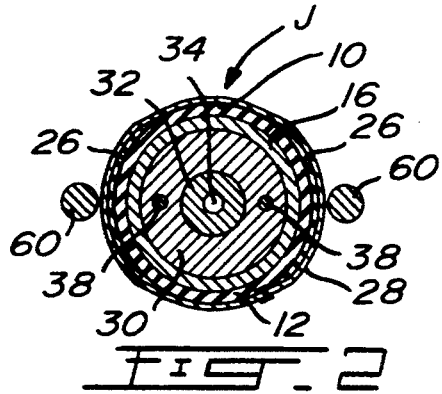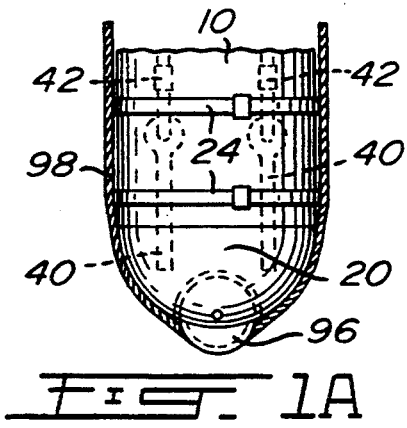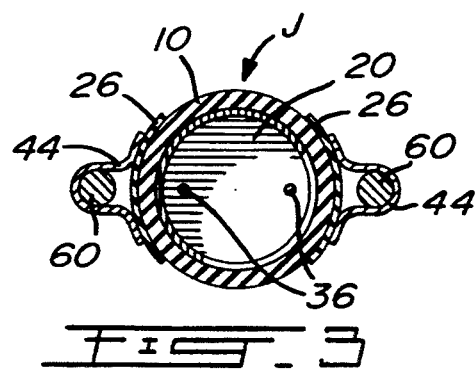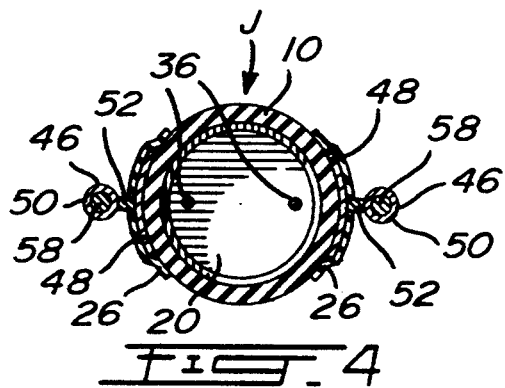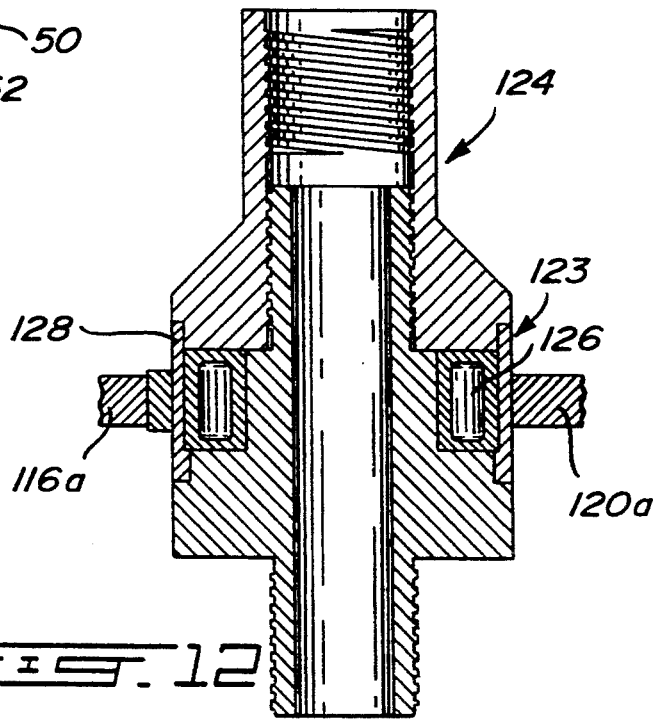

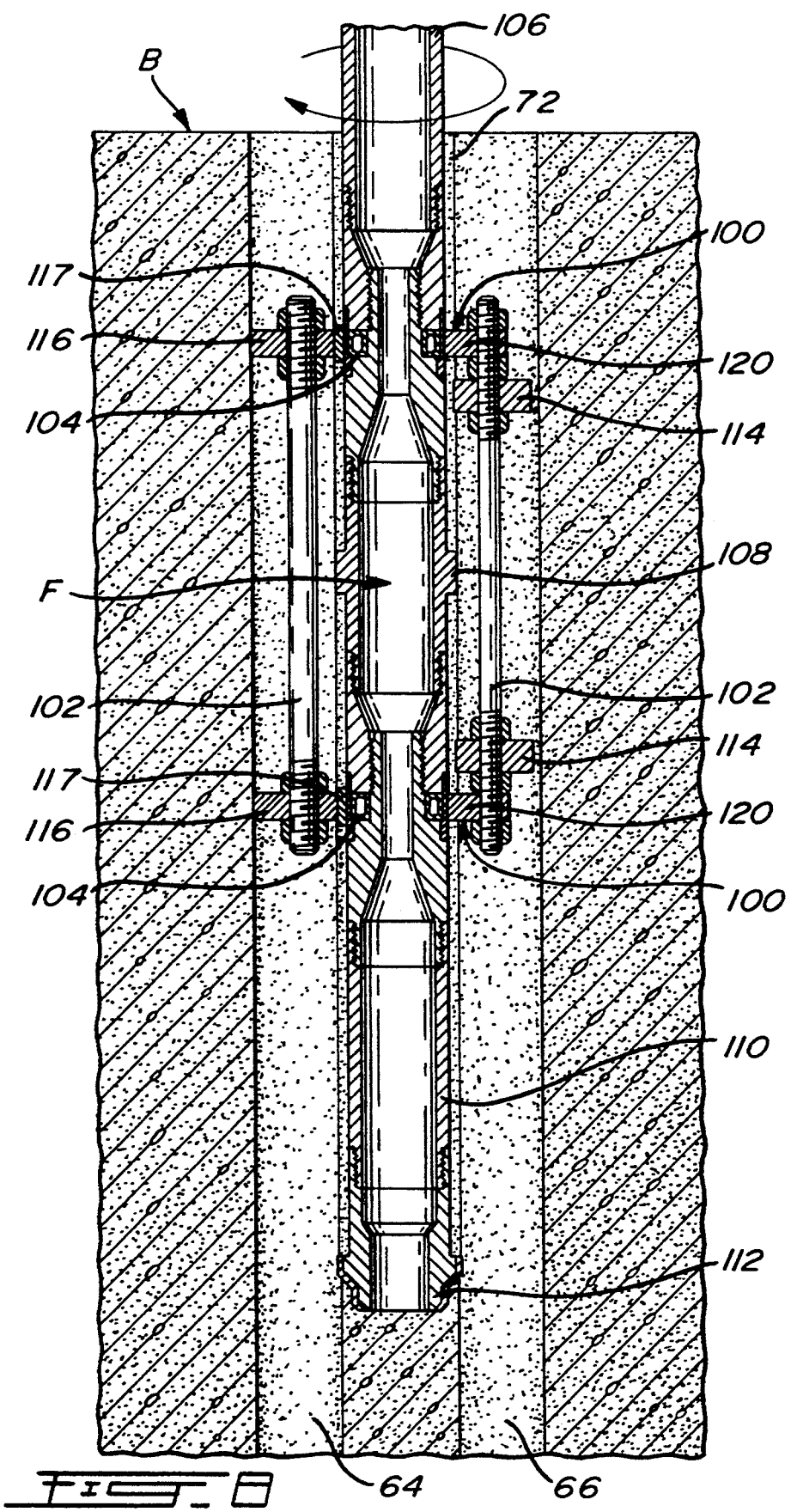

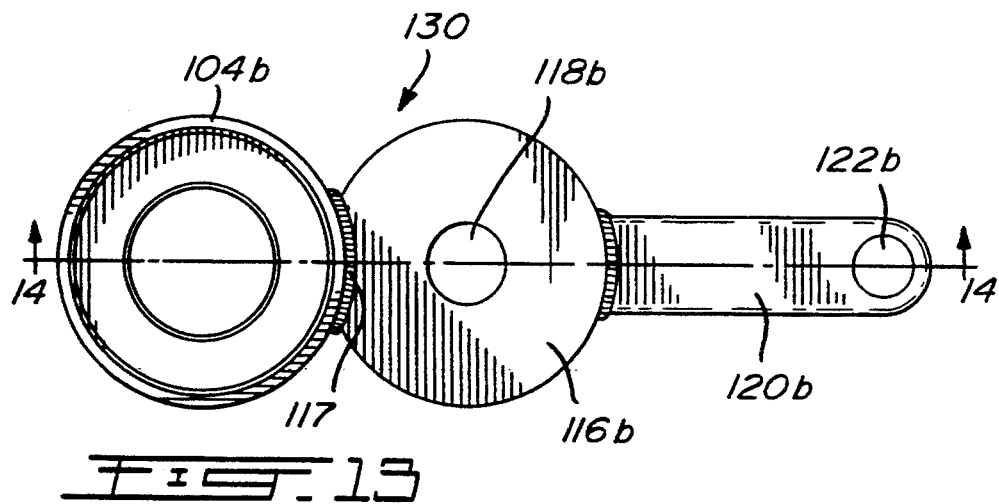
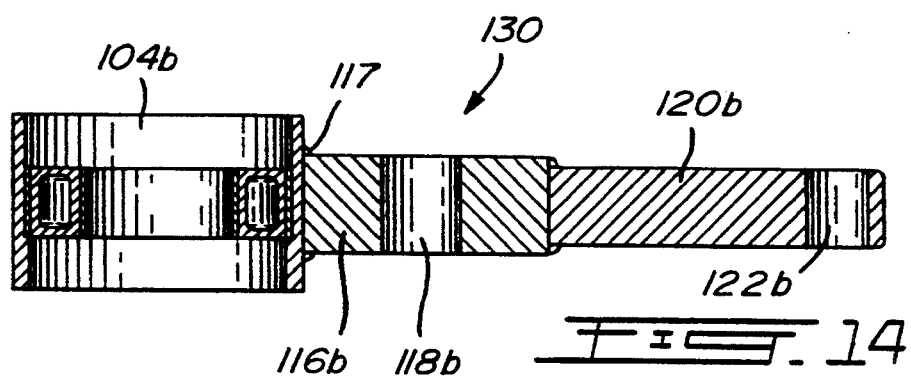
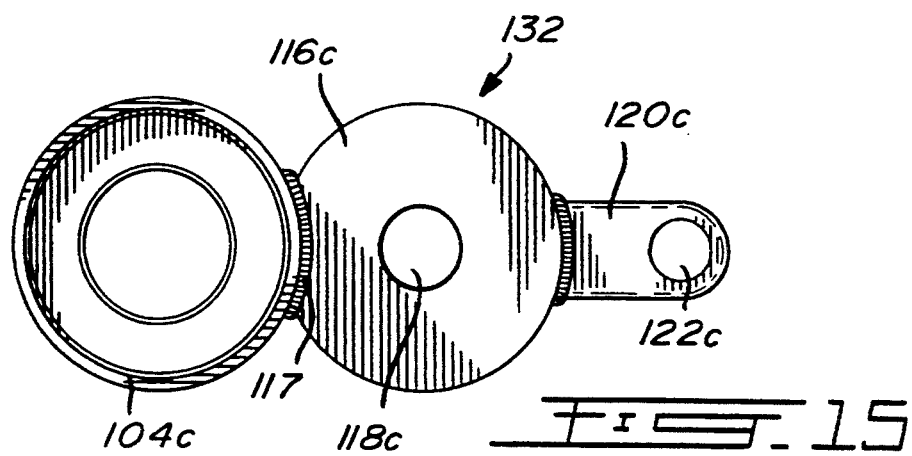

SEALING DEVICE FOR EXPANSION JOINTS OF CONCRETE DAMS AND METHOD FOR INSTALLING SAME

BACKGROUND OF THE INVENTION

1. Field of the Invention

The present invention relates to concrete works, such as gravity dams and, more particularly, to a sealing device for sealing expansion joints cut in dams of this type.

2. Description of the Prior Art

Concrete dams, either gravity dams, arched dams, or even dams with joints can suffer from behavioral problems such as, for jointless dams, the fissuring of the dam due to stresses, or the inflation of the dam caused, for instance, by chemical reactions in the dam. In the case of the dams having joints, it happens that the joints leak.

For repairing concrete dams so affected, a joint must be produced for preventing the transmission of the stresses, for diminishing the inner stresses and for providing space for the ulterior volume increase of the concrete. The methods actually known are complicated and very costly. The section to cut necessitates first the construction of a coffer-dam on the wet side or upstream of the dam which has the height of the dam for preventing the flow of water through the cut during the repairs. Such a coffer-dam is subject to very high pressures whereby it represents security problems which are partially resolved by a very costly installation. The repairs must be done by divers and even by divers in diving suits depending on the depths. Also, it is necessary to continuously pump water which infiltrates the coffer-dam. The repairs of concrete dams using this method are thus very costly. Once the repairs are completed, it is very advantageous to replace the coffer-dam by a sealing device. To date, there does not exist any known device of this type of long-term efficiency.

To offer expansion joints to concrete dams, certain tests have been made with the insertion between the concrete sections of the dam of joints made of plastic materials. However, once flattened by the displacement of the dam, the plastic joint does not recover its initial form when the dam returns to its original position, which results in joints that leak. Also, there is no adherence between the plastic joint and the concrete dam. The use of joints made of caulking would produce the same results since these joints would dry up after one or two years.

To produce expansion joints in concrete dams, it has also been proposed to construct the dams with a plurality of distinct sections which are nested and separated by an empty space which acts as a play during the displacements of the various sections of the dams. Each section of the dam is coffered independently with a spaced nesting for producing the joint. For sealing the extremity of the joint located upstream, sealing plates are installed which adjust when the sections of the dam shift one with respect to the other in order that the dam maintains its water tight feature. As the spaces between the various sections of the dam which serve as joints become filled in due time with limestone and others, the gaps become filled, thereby eliminating the play between the sections of the dam and consequently the expansion joint itself.

SUMMARY OF THE INVENTION

It is therefore an aim of the present invention to provide a sealing device for concrete works.

It is also an aim of the present invention to provide a sealing device for sealing expansion joints cut in concrete dams which adjusts itself to the movements of the dam.

It is a further aim of the present invention to provide a sealing device for concrete works which is of economical manufacture and of easy installation, secure and of relative low cost as a substitute for the low efficiency sealing devices used to this date. The sealing of the cuts defined in the dams to correct the behavioral abnormalities is accomplished by a simple and relatively low cost method using an efficient and also relatively low cost sealing joint.

It is a still further aim of the present invention to provide a method for producing in a concrete dam an expansion joint characterized by a sealing device in accordance with the present invention. A method is also suggested for replacing a sealing device in accordance with the present invention by a new sealing device. A method is also suggested for avoiding the installation of a coffer-dam upstream of the dam.

It is a still further aim of the present invention to provide a guiding device for overlapping and parallel borings to allow, amongst others, the installation in a concrete dam of an expansion joint characterized by a sealing device in accordance with the present invention.

Therefore in accordance with the present invention, there is provided a sealing device for sealing an opening defined in a concrete work comprising a cell made of an elastic material and including at least one tubular section, the cell being provided at upper and lower ends thereof respectively with rigid upper and lower end members, a lower surface of the lower end member being shaped for facilitating the insertion of the sealing device in a hole defined on the opening, not very extensible means mounted between the upper and lower end members for preventing the longitudinal stretching of the cell, the cell including reinforcement means spaced one from the other and adapted to be disposed opposite the opening for preventing the deformation of the cell in the opening, a continuous peripheral space being defined on the cell between the lower ends of the reinforcement means and the upper end of the lower end member, and means for allowing the positioning and the installation of the sealing device.

Also, in accordance with the present invention, there is provided a method for the installation of an expansion joint in a concrete work with a sealing device which comprises a tubular and elastic cell provided at upper and lower ends thereof respectively with rigid upper and lower end members, a lower surface of the lower end member being shaped for facilitating the insertion of the sealing device in the concrete work, not very extensible means mounted between the upper and lower end members, the cell including reinforcement means spaced one from the other, a continuous peripheral space being defined on the cell between the lower ends of the reinforcement means and the upper end of the lower end member, the method including the following steps:

a) the boring of a first hole in the work intended for receiving the sealing device;

b) the installation of the sealing device in the first hole, the reinforcement means being positioned in the direction of the flow;
c) the filling under required pressure of the cell with at least one appropriate fluid; and
d) the completion of the expansion joint by cutting the work in the direction of the flow and opposite the reinforcement means, the cut communicating with the first hole and thus with the sealing device and extending to a depth substantially corresponding to the lower ends of the reinforcement means so that the section of the cell located between the reinforcement means and the lower end member contacts along its periphery the walls of the first hole.

Also, in accordance with the present invention, there is provided a method for the installation of an expansion joint in a concrete dam with a sealing device which comprises a tubular and elastic cell provided at upper and lower extremities thereof respectively with rigid and lower end members, a lower surface of the lower end member being shaped for facilitating the insertion of the sealing device in the dam, not very extensible means mounted between the upper and lower end members, the cell including reinforcement means spaced one from the other, a continuous peripheral space being defined on the cell between the lower ends of the reinforcement means and the upper end of the lower end member, the method including the following steps:
a) the boring of a first hole in the dam intended for receiving the sealing device;
b) the installation of the sealing device in the first hole, the reinforcement means being positioned in the direction of the water flow;
c) the filling under required pressure of the cell with at least one appropriate fluid; and
d) the completion of the expansion joint by the cutting of the dam in the direction of the water flow and opposite the reinforcement means, the cut communicating with the first hole and thus with the sealing device and extending to a depth substantially corresponding to the lower ends of the reinforcement means so that the section of the cell located between the reinforcement means and the lower end member contacts along its periphery the walls of the first hole.

Also, in accordance with the present invention, there is provided a method for the readjustment of a sealing device of an expansion joint cut in a concrete dam, the sealing device comprising a tubular and elastic cell provided at upper and lower ends thereof respectively with rigid upper and lower end members, a bottom surface of the lower end member being shaped for facilitating the insertion of the sealing device in the dam, not very extensible means mounted between the upper and lower end members, the cell including reinforcement means spaced one from another, a continuous peripheral space being defined on the cell between the lower ends of the reinforcement means and the upper end of the lower end member, the sealing device being installed in a first hole defined in the concrete dam on the expansion joint, the reinforcement means being positioned in the direction of the flow of water, the cell being pressurized with at least one appropriate fluid, a second sealing device, similar to the sealing device of the first hole, being installed in a second hole also defined on the expansion joint, the method including the following steps:
a) the pressurization of the second sealing device under required pressure with at least one appropriate fluid;
b) the depressurization at least partial of the sealing device of the first hole in such a way as to eliminate the adherence thereof with the walls of the first hole and for allowing this sealing device to recover its position in the first hole; and
c) the pressurization of the sealing device of the first hole.

Also, in accordance with the present invention, there is provided a method for the readjustment of a sealing device of an expansion joint cut in a concrete dam, the sealing device comprising a tubular and elastic cell provided at upper and lower ends thereof respectively with rigid upper and lower end members, a bottom surface of the lower end member being shaped for facilitating the insertion of the sealing device in the dam, not very extensible means mounted between the upper and lower end members, the cell including reinforcement means spaced one from another, a continuous peripheral space being defined on the cell between the lower ends of the reinforcement means and the upper end of the lower end member, the sealing device being installed in a first hole defined in the concrete dam on the expansion joint, the reinforcement means being positioned in the direction of the flow of water, the cell being pressurized with at least one appropriate fluid, the method including the following steps:
a) the boring of a second hole on the expansion joint intended for receiving a second sealing device similar to the sealing device of the first hole;
b) the installation of the second sealing device in the second hole;
c) the filling of the second sealing device under required pressure with at least one appropriate fluid;
d) the depressurization at least partial of the sealing device of the first hole in such a way as to eliminate the adherence thereof with the walls of the first hole and for allowing this sealing device to recover its position in the first hole; and
e) the pressurization of the sealing device of the first hole.

Also, in accordance with the present invention, there is provided a method for the replacement of a sealing device of an expansion joint cut in a concrete dam, the sealing device comprising a tubular and elastic cell provided at upper and lower ends thereof respectively with rigid upper and lower end members, a bottom surface of the lower end member being shaped for facilitating the insertion of the sealing device in the dam, not very extensible means mounted between the upper and lower end members, the cell including reinforcement means spaced one from another, a continuous peripheral space being defined on the cell between the lower ends of the reinforcement means and the upper end of the lower end member, the sealing device being installed in a first hole defined in the concrete dam on the expansion joint, the reinforcement means being positioned in the direction of the flow of water, the cell being pressurized with at least one appropriate fluid, a second sealing device, similar to the sealing device of the first hole, being installed in a second hole also defined on the expansion joint, the method including the following steps:
a) the pressurization of the second sealing device under required pressure with at least one appropriate fluid;

b) the depressurization of the sealing of the first hole;
c) emptying the fluid contained in the sealing device of the first hole and the withdrawal thereof from the first hole; and
d) the installation of a new sealing device in the first hole, its subsequent filling with at least one appropriate fluid, and the pressurization of the new sealing device of the first hole.

Also, in accordance with the present invention, there is provided a method for the readjustment of a sealing device of an expansion joint cut in a concrete dam, the sealing device comprising a tubular and elastic cell provided at upper and lower ends thereof respectively with rigid upper and lower end members, a bottom surface of the lower end member being shaped for facilitating the insertion of the sealing device in the dam, not very extensible means mounted between the upper and lower end members, the cell including reinforcement means spaced one from another, a continuous peripheral space being defined on the cell between the lower ends of the reinforcement means and the upper end of the lower end member, the sealing device being installed in a first hole defined in the concrete dam on the expansion joint, the reinforcement means being positioned in the direction of the flow of water, the cell being pressurized with at least one appropriate fluid, the method including the following steps:
a) the boring of a second hole on the expansion joint intended for receiving a second sealing device similar to the sealing device of the first hole;
b) the installation of the second sealing device in the second hole;
c) the filling of the second sealing device under required pressure with at least one appropriate fluid;
d) the depressurization of the sealing device of the first hole;
e) emptying the fluid contained in the sealing device of the first hole and its withdrawal from the first hole; and
f) the installation of a new sealing device in the first hole, its subsequent filling with at least one appropriate fluid, and the pressurization of the new sealing device of the first hole.

Also, in accordance with the present invention, there is provided a guiding device for boring a hole overlapping an existing opening and parallel therewith, the guiding device comprising at least two guide means connected one to each other and spaced in the direction of the boring, each guide means comprising a bearing having a diameter substantially equal to the new hole to bore, and comprising two guide members for insertion in the opening, the guide members of one of the guide means being mounted to respective guide members of the other guide means in a spaced and substantially aligned relation so that the bearing follows the opening during the boring of the new hole, the bearings being adapted to be rotatably mounted to a boring head so that the guiding device displaces in a translational movement along the opening.

Also, in accordance with the present invention, there is provided a guiding device for producing overlapping and parallel borings, from a first and a second hole, the guiding device comprising at least two guide means connected by elongated members, each guide means comprising a bearing having a diameter substantially equal to the new hole to bore, a guide disk for insertion in the first hole and having a diameter substantially equal to that of the first hole, and an extension for insertion in the second hole, the two guide disks being mounted one to the other in an aligned and spaced relation with two elongated members joining respectively the two guide disks and the two extensions, the bearings being adapted to be rotatably mounted to a boring head so that the guiding device displaces in a translational movement in the holes.

Also, in accordance with the present invention, there is provided a method for impermeabilizing an opening in a concrete work with a sealing device which comprises an elastic and tubular cell provided at upper and lower extremities thereof respectively with rigid upper and lower end members, a lower surface of the lower end member being shaped for facilitating the insertion of the sealing device in the work, not very extensible means mounted between the upper and lower end members, the method comprising the following steps:
a) the boring of a first hole on the opening of the work, the hole being intended to receive the sealing device;
b) the installation of the sealing device in the first hole; and
c) the filling under required pressure of the cell with at least one appropriate fluid.

Also, in accordance with the present invention, there is provided a method for filling an opening in a rigid work, the opening offering a preferential path preventing a filling material from staying in the opening, the method using a temporary sealing device which comprises an elastic and tubular cell provided at upper and lower ends thereof respectively with rigid upper and lower end members, a lower surface of the lower end member being shaped for facilitating the insertion of the sealing device in the work, not very extensible means mounted between the upper and lower end members, the method including the following steps:
a) the boring of a first hole in the opening at a location where the installation of the sealing device in the first hole will close the preferential path of the filling material;
b) the installation of the sealing device in the first hole;
c) the filling of the cell under required pressure with at least one appropriate fluid; and
d) the filling of the opening exteriorly of the sealing device with the filling material.

Also, in accordance with the present invention, there is provided a method for the installation of a sealing device in an expansion joint previously formed in a concrete work, a first hole having been previously defined in the expansion joint deeper than the cut of the expansion joint for receiving eventually the sealing device, the sealing device comprising a tubular and relatively elastic and resistant cell, the cell being provided at upper and lower ends thereof respectively with rigid upper and lower end members, a lower surface of the lower end member being shaped for facilitating the insertion of the sealing device in the work, not very extensible means mounted between the upper and lower end members, the method comprising the following steps:
a) the installation of the sealing device in the first hole; and
b) the filling under required pressure of the cell with at least one appropriate fluid.

BRIEF DESCRIPTION OF THE DRAWINGS

Having thus generally described the nature of the invention, reference will now be made to the accompanying drawings, showing by way of illustration a preferred embodiment thereof, and in which:

FIG. 1 is an elevation view partly in cross-section and fragmented of a sealing device in accordance with the present invention used in an expansion joint of a concrete dam;

FIG. 1A is an elevation view illustrating a variant of the lower part of the sealing device of FIG. 1;

FIGS. 2, 3 and 4 are cross-sectional views taken respectively along lines 2—2, 3—3 and 4—4 of FIG. 1;

FIG. 8 is a cross-sectional side view illustrating a guiding device for overlapping and parallel borings in accordance with the present invention, and illustrated in operation in the dam;

FIG. 12 is a cross-sectional elevation of an adapter for the guiding device of FIG. 10;

FIG. 13 is a plan view of another construction of a guiding device for overlapping and parallel borings in accordance with the present invention;

FIG. 14 is a cross-sectional view taken along lines 14—14 of FIG. 13; and

FIG. 15 is a plan view of a still further construction of a guiding device for overlapping and parallel borings in accordance with the present invention.

DESCRIPTION OF THE PREFERRED EMBODIMENTS

Figure 5:
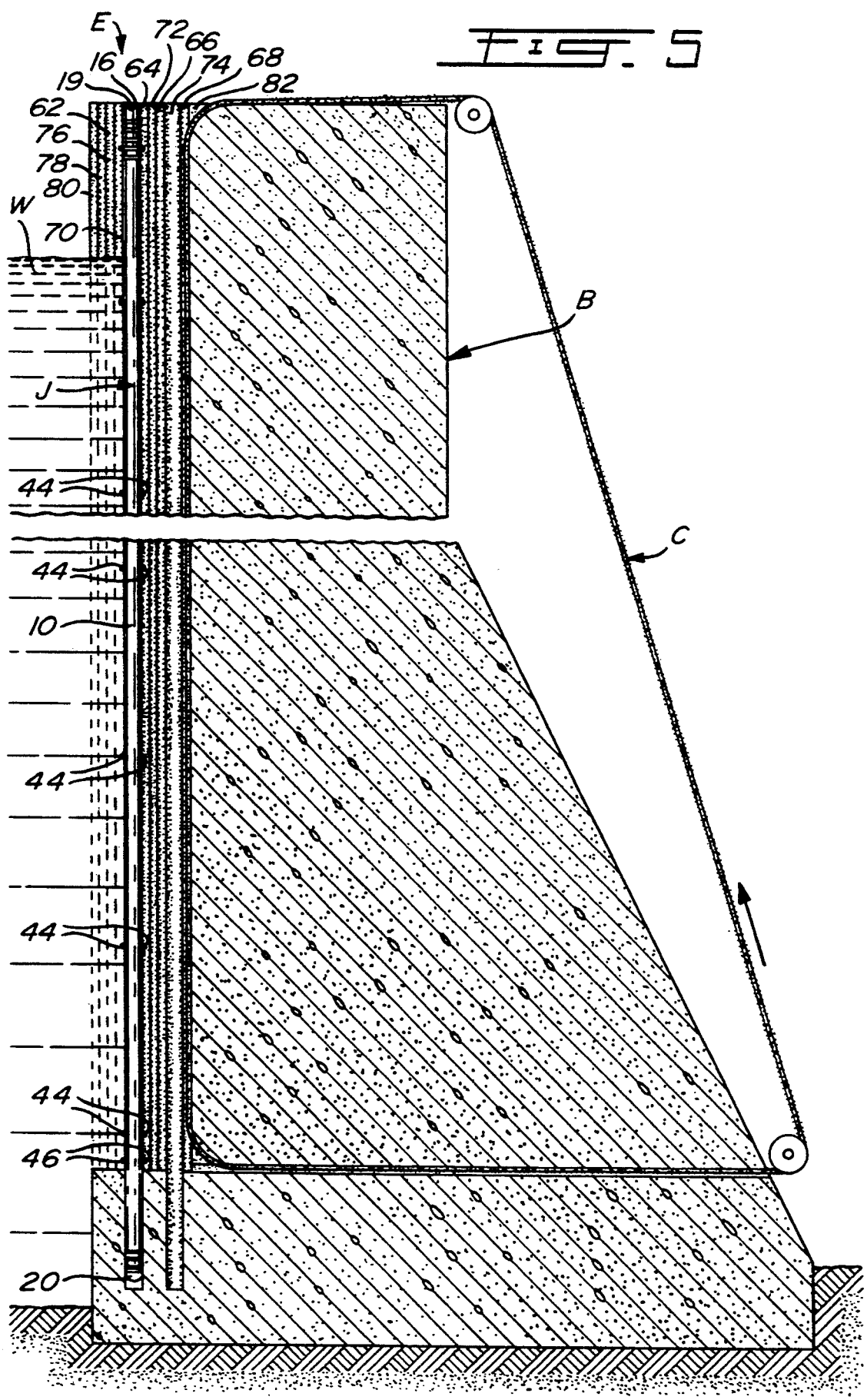
FIG. 5 is a cross-sectional side view of a concrete dam on which is produced an expansion joint using the sealing device of FIG. 1 and illustrating more particularly a cutting system of the downstream section of the dam.

In accordance with the present invention, FIGS. 1 to 5 illustrate a sealing joint J for an expansion joint E defined in a concrete work such as a gravity dam B. The cut of the expansion joint E in the dam B and the installation of the sealing joint J in the expansion joint E will be described hereinbelow in details with reference to FIGS. 5 to 7.

Now follows the structural description of the sealing joint J. The sealing joint J comprises a tubular cylindrical cell 10 made of a rubber material. The cell 10 is open at its upper and lower ends 12 and 14, respectively. The cell 10 can be made from a rectangular sheet of height equal to the height of the desired cell and of a width superior to the circumference of this cell. Therefore, the cell 10 is constructed by folding the sheet in order to produce a tube while overlapping the longitudinal edges of the sheet. The overlapping portions of the sheet are fixed one to the other with an adhesive. A rigid cylindrical ferrule 16 is fixedly inserted in the upper end 12 of the cell 10 using anchoring teeth 18 defined on the periphery of the upper ferrule 16 and which penetrate partially the cell 10 in order to cling thereto. The upper ferrule 16 defines next to its upper free edge four holes 19 equidistantly spaced along the periphery of the upper ferrule 16. Two of the holes 19 are used for the manipulation of the sealing joint J, for instance with a crane or a scaffolding provided with a spool, for its insertion in the expansion joint E, whereas the two other holes 19 are used for fixing the sealing joint J to the top of the dam B in order that the sealing joint J is suspended in the hole which receives it.

A rigid lower ferrule 20 having an upper cylindrical section and a semi-spherical lower section is inserted in the lower end 14 of the cell 10 and is fixed thereto in a way similar as the upper ferrule 16, that is with anchoring teeth 22 defined on the outer peripheral surface of the lower ferrule 20 and which grip the inner surface of the lower end 14 of the cell 10. Retaining collars 24 are positioned and tensioned around the lower end 14 of the cell 10 opposite the cylindrical section of the lower ferrule 20 in a way to produce a more solid connection between the cell 10 and the lower ferrule 20.

Two reinforcements 26 having an elongated shape and a section shaped as a segment of a circle are mounted in an opposed and longitudinal way exteriorly on one side and the other of the cell 10 (see FIG. 2). These reinforcements 26 may be made of a hard material (such as tire-cord) in order to prevent a radial deflection of the cell 10 opposite the installation of these reinforcements 26, even under the effect of the internal pressure which is exerted on the cell 10 when it is filled with a liquid and pressurized, as will be described with more details in the description of the installation of the sealing joint J in the text which follows. The reinforcements 26 can, for instance, be mounted to the cell 10 using a glue. The possibility of installing the reinforcements 26 between layers of the cell 10 is also contemplated.

Retaining collars 28 are mounted with tension around the cell 10 and the reinforcements 26 opposite the upper ferrule 16. These retaining collars 28 have the same function as the retaining collars 24 which act on the lower ferrule 20.

A retaining ring 30 is fixedly mounted to the inner surface of the upper ferrule 16 with a weld. This retaining ring 30 defines in its middle a threaded opening which receives a plug 32 of complementary threaded exterior surface. The plug 32 comprises a circular central opening 34 which communicates with a tubulure 33 on which is installed a valve 35 for allowing the filling of the sealing joint J with liquid and maybe with gas and for ensuring that the pressure exerted by the latter in the joint J is maintained.

At least two cables 36 are mounted inside the cell 10 in a way to connect the upper and lower ferrules 16 and 20, respectively. The cables 36 prevent the longitudinal deformation or the stretching of the cell 10 which could result from its flexibility, from its elasticity and from the weight suspended thereto. The upper ends of the cables 36 are mounted to the retaining ring 30 with eye-bolts 38 welded to the retaining ring 30, whereas the lower ends of the cables 36 are fixed to the solid conical section of the lower ferrule 20 also with eye-bolts 40 joined to this conical section by welding. The ends of the cables 36 are engaged in the holes of the eye-bolts 38 and 40 and are then folded back and maintained set by clamping bands 42. It could be possible to eliminate the cables 36 and, in this case, the resistance to the stretching of the cell 10 would be undertaken by the reinforcements 26.

The upper and lower ferrules 16 and 20 are, in the illustrated construction, made of stainless steel. The retaining ring 30 is welded to the upper ferrule 16 and the eye-bolts 38 are welded to the retaining ring 30. The eye-bolts 40 are welded to the lower ferrule 20. It is also foreseen to use ferrules 16 and 20 which are made of a plastic material, such as nylon, and an assembly with an adhesive or other of the parts which are to be fixed thereto, that is the retaining ring 30 and the eye-bolts 38 and 40. The screwing of the eye-bolts 38 and 40 is also foreseen in replacement of or in addition to the adhesive. The advantage of plastic with respect to stainless steel lies in that it is possible to bore through the plastic ferrules if the sealing joint J become wedged in its hole for one reason or another.

Guide rings 44 are mounted in a spaced relationship along each of the reinforcements 26 (see also FIG. 3). Next to the lower end of each of the reinforcements 26 is mounted a guiding coupling sleeve 46 which includes an arched base 48 (see FIG. 4) disposed between the reinforcement 26 and the cell 10 and which comprises also a tubular section 50 having a threaded inner surface and joined to the base 48 by a neck 52 having the shape of a small plate disposed longitudinally along the cell 10 and extending radially therefrom. This neck 52 is preferably screwed to the arched base 48 for allowing the guiding coupling sleeves 46 and, more particularly, the tubular sections 50 and the necks 52 thereof to be removed from the sealing joint J. A guiding adaptor 54 is screwed at its lower end 56 with a left-hand thread in the threaded tubular section 50 of each of the two guiding coupling sleeves 46. The upper end of each guiding adaptor 54 comprises a cylindrical tubular section 58 defining a thread in its central opening.

As it will be described in more details hereinafter, a guide rod 60 of cylindrical shape is slid opposite each of the reinforcements 26 in respective guide rings 44 for the installation of the sealing joint J in the expansion joint E. The lower ends of the guide rods 60 define a threaded section which is screwed in the tubular cylindrical section 58 of a respective guiding adaptor 54.

Figure 6:
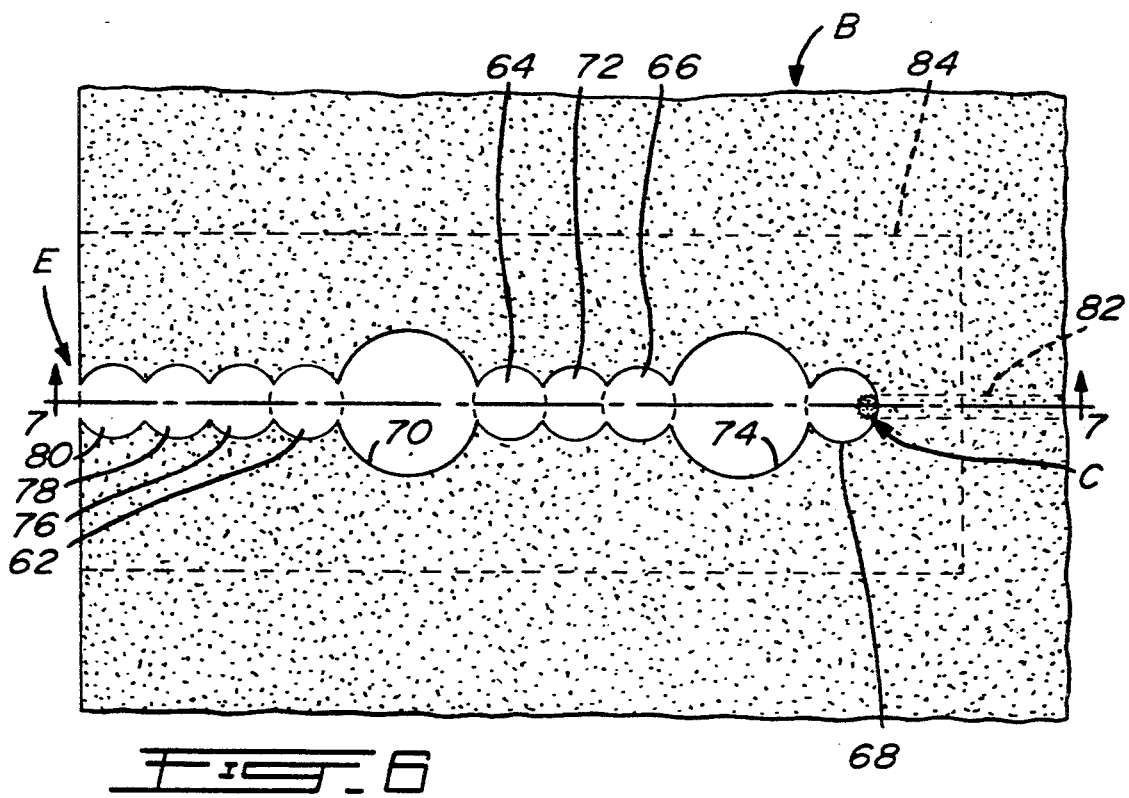
FIG. 6 is a plan view of a portion of the dam showing the disposition of the openings defined in the dam for producing the expansion joint, the sealing device having been removed from FIG. 6 for illustration purposes.
Figure 7:
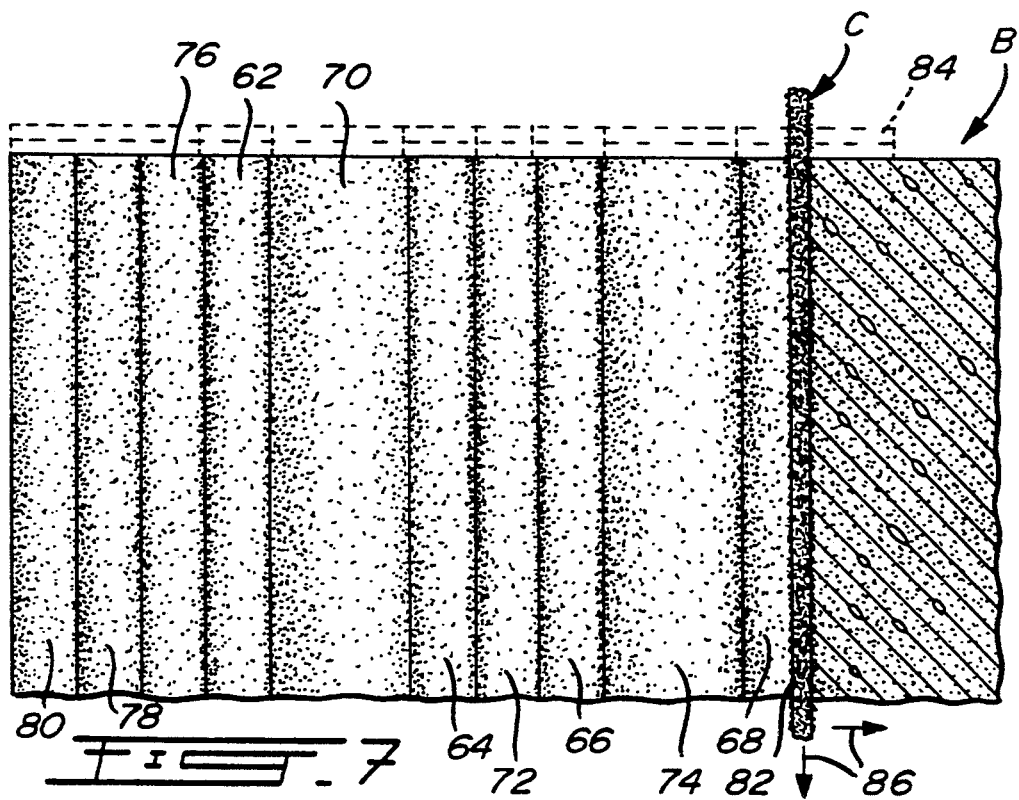
FIG. 7 is a cross-sectional side view taken along lines 7—7 of FIG. 6.

FIGS. 5 to 7 illustrate a method to produce an expansion joint E in a gravity dam B, this expansion joint E being mainly constituted by a vertical cut produced according to a plurality of steps transversely of the dam B and almost along all of its height and by the positioning of the sealing joint J in the cut defined in the dam B.

To produce the cut in the dam B, three types of borings are used, according to the illustrated method. The first consists of boring holes in the dam which are completely vertical using a boring apparatus of controlled verticality developed by Applicant and which belongs to the public domain. The second type of boring corresponds to a boring for which the verticality is ensured by a guiding device linked to two holes bored in a vertical way which can be the result of controlled verticality borings. This guiding device represents another aspect of the present invention which will be described in details further along in this text with reference to FIGS. 8 to 15. The third type of boring uses a diamond cutting cable C which constitutes a modification of similar cables used in stone-pits for various sawing activities. Such a diamond cutting cable C produces a cut in the dam B of uniform width (10 to 15 millimeters wide), whereas the borings resulting from the first two types of borings briefly described hereinabove produce overlapping circular holes in order to form in the dam B a continuous cut but of varying width.

With reference to FIG. 5, vertical circular holes 62, 64, 66, 68, 70, 72, 74, 76, 78 and 80 have been bored in the dam B by borings produced either with the controlled verticality boring device, or with a more conventional boring device using the guiding device briefly mentioned hereinbefore which has been engaged in two previous vertical holes. The sealing joint J must be installed in the hole 70 of FIG. 5 or of FIG. 5A before the cut formed from the hole 70 in which the sealing joint J is located reaches the water W situated upstream of the dam B (i.e. behind the dam). The cut of the expansion joint E is completed by cutting a large section of the dam B with the diamond cutting cable C (see the uniform width cut 82 initiated in FIGS. 5 and 5A and shown in phantom lines in FIG. 6).

Now referring to FIGS. 6 and 7, a drill jig or template 84 is used for ensuring amongst others the orientation of the cut in the dam B to produce the expansion joint E. Indeed, the template 84 permits the alignment of the holes forming the cut in the expansion joint E along a pre-established orientation.

Therefore, following a method in accordance with the present invention, the first four holes are bored, that is the holes 62, 64, 66 and 68. These holes which are bored using a controlled verticality boring device are defined in the dam B so as to overlap on both sides the two holes 70 and 74 intended for receiving the sealing joint J. The holes 62, 64, 66 and 68 being substantially perfectly vertical, a boring device is now used for boring the circular holes 70, 72, 74 and 76 which is mounted to a guiding device for overlapping borings which are parallel in relation to one another.

Figure 5A:
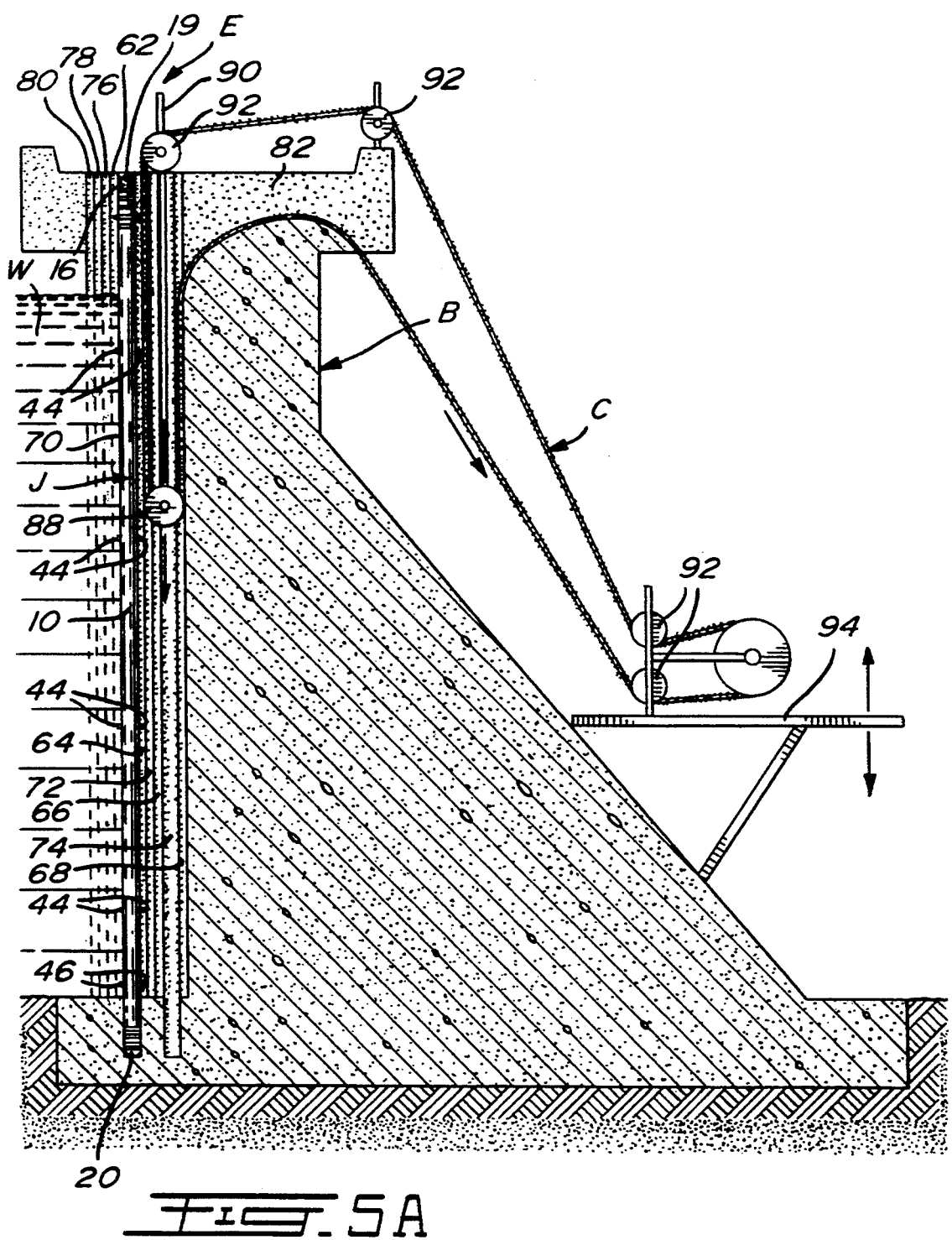
FIG. 5A is a cross-sectional side view similar to FIG. 5 but illustrating a variant of the cutting system.

Then, the sealing joint J is lowered in the hole 70 using a crane or other which is fastened to two of the holes 19 of the upper ferrule 16 of the sealing joint J. The semi-spherical shape of the lower ferrule 20 facilitates the insertion and the lowering of the sealing joint J in the hole 70 with the advancement of the sealing joint J in the hole 70 resulting from the weight thereof. The guide rods 60 are inserted in the holes 62 and 64 which overlap both sides of the hole 70 which receives the sealing joint J for guiding the sealing joint in its hole 70. Therefore, the reinforcements 26 are positioned opposite the cut and will thus form an obstacle to the deformation of the cell 10 towards and partly in the holes 62 and 64 which could result from the outer radial pressure exerted in the cell 10. The vertical edges of each reinforcement 26 abut the inner walls of the hole 70 on each side of the opening communicating with the holes 62 and 64 due to the overlapping of the holes. The sealing joint J could be installed in the hole 70 using only one of the guide rods 60. Also, the sealing joint J could be installed so that the lower ferrule 20 abuts the bottom of the hole 70, as illustrated in FIG. 5A. On the other hand, the lower ferrule 20 can be positioned in such a way as to be suspended in the hole 70 (see FIG. 5) with a view of leaving a gap or a play in the hole 70. Indeed, if the lower ferrule 20 brakes, it can be simply pushed to the bottom of the hole 70 and a new sealing joint J can then be installed with the original and defective lower ferrule being kept at the bottom of the hole 70.

The sealing joint J is then fixed to the dam B by connecting the two other holes 19 of the upper ferrule 16 to concrete of the dam B adjacent to the upper end of the hole 70. The sealing joint J is then filled with a non-freezing liquid (at least in regions which are subject to low temperatures), such as an antifreeze which does not attack the rubber of the sealing joint J (Prestone ™). A pressurized gas can then be introduced in the cell 10 to obtain the desired pressure therein. The gas can be air or any other gas, and a pressure of 15 to 25 lbs. in the cell 10 will ensure that there will not be any water leaks between the sealing joint J and the walls of the hole 70. The plug 32 is closed to seal the cell 10 to maintain the same under pressure. The guide rods 60 are then unscrewed from the guiding adaptors 54 and slidably removed from the guide rings 44 and from the holes 62 and 64. The insertion of the sealing joint J in the hole 70 under its own weight is facilitated if the cell 10 is gradually filled with its liquid. Also, the walls of the hole 70 can be lubricated for instance with bentonite or with a polymer-based fluid.

Once the sealing joint J has been correctly installed, the dam B can be bored towards the water by excavating, in order, the holes 78 and 80 using the boring device which was used for producing the holes 70, 72, 74 and 76. The verticality and the parallelism of the holes are ensured by the guiding device for overlapping borings which are parallel in relation with one another mentioned previously and described in details hereinafter. Finally, the diamond cutting cable C is used for excavating the cut 82 and thus join the hole 68 to the front of the dam B (to its side opposite the water) in order to complete the cut of the expansion joint E. Arrows 86 of FIG. 7 show the directions of advancement of the diamond cutting cable C during the cutting of cut 82. Previously, a horizontal hole can be bored to join the front of the dam B to the hole 68 and thus allow the diamond cutting cable C to surround the dam B as seen in FIG. 5. Other arrangements can be used for the path of the diamond cutting cable, for instance, in cases where the horizontal hole would have to reach a narrow cut. In this case and in others, another method of utilization of the diamond cutting cable C can be used, as illustrated in FIG. 5A.

In FIG. 5A, the diamond cutting cable C is guided by a movable pulley 88 which is mounted, for instance, to a hydraulic jack 90 and by guide pulleys 92. The movable pulley 88 is inserted at a certain depth (10 feet, for instance) in the holes which are adjacent to the cut that is intended to be produced by the diamond cutting cable C. One of the two sections of the diamond cutting cable which come out of these holes is guided by the pulley 92 located above the dam B, whereas the other section of the cable leans against the top of the dam so as to exert a pressure towards the bottom and thus gradually cut the dam towards the bottom. When the cut 82 has almost reached the level of the movable pulley 88, the diamond cutting cable C does not exert force anymore on the concrete and cannot thus continue to cut the dam B. Therefore, the sawing is stopped and the movable pulley 88 is lowered an additional distance (for instance, a further 10 feet). The sawing then resumes with the gradual lowering of the movable pulley 88 in discrete steps until the cut 82 is completed. A movable scaffolding 94 can be used for ensuring at all times an appropriate sawing load on the dam B.

With reference to FIG. 5, the holes 70 and 74 (which are those intended to each receive a sealing joint J) have been bored deeper (that is 4 to 5 feet deeper) in the dam B than the other holes 62, 64, 66, 68, 72, 76, 78 and 80 and than the sawed cut 82, the sealing joint J reaching or almost reaching the bottom of the hole 70. The reinforcements 26 are dimensioned in length in order to extend downward at least up to the lower ends of the holes 62 and 64 which are adjacent to the hole 70 in which is located the sealing joint J. This has for object to prevent the deformation of the cell 10 by infiltration in the adjacent holes, which could damage the cell 10 and maybe cause its rupture, especially on the downstream side (that is on the side of the hole 64) where there is little resistance to such deformation. These reinforcements 26 do not extend on the portion of the cell 10 located lower than the bottom of the adjacent holes 62 and 64. With this configuration, the cell 10 can on all of its circumference contact the walls of the hole 70 located lower than the overlap with the holes 62 and 64 since the cell 10 does not include any reinforcement at that location, this in order to prevent water from passing around the lower end of the cell 10.

It is also possible to install an additional sealing joint in the hole 74 intended therefor which could serve as a replacement to the joint of the hole 70, either for its readjustment or other manipulations. In the case of the installation of the sealing joint J in the hole 74, it is necessary to fill its cell 10 with liquid in order to give it a shape and to prevent its damage. However, the cell 10 of the hole 74 is not pressurized with a gas in order to allow water located in the holes 64, 66 and 72 following rainfalls or infiltrations through the concrete of the dam B (that is in the holes located between the two sealing joints J) from draining therefrom through the second joint J and the walls of its hole 74.

For instance, the second joint J can serve for the readjustment of the first sealing joint J in its hole 70. Indeed, following movements of the dam B, the cell 10 of the first sealing joint J can become slightly twisted in its hole 70. To prevent the rupture of the cell 10, it is desirable to decrease the pressure in the cell 10, for instance by removing therefrom the pressure due to the gas, in a way to eliminate the adherence between the cell 10 and the walls of the hole 70. By doing so, the cell 10 recaptures in a natural way a non-twisted shape. The cell 10 can then again be pressurized. However, to proceed with the readjustment of the cell 10, it is first necessary to ensure the tightness of the dam B in the cut that has been defined therein. Therefore, before removing the tension in the cell 10 of the hole 70, the cell of the second sealing joint J which had previously been positioned in the hole 74 is pressurized with a gas. When the cell 10 of the first joint J has readjusted itself in its hole 70, the pressure is removed from the joint J of the hole 74, thereby allowing the small volume of water imprisoned between the sealing joints J of the holes 70 and 74 to drain on the downstream side of the dam B, which prevents the possible rupture of the joints J due to the freezing of the water mass contained in the cut between the two sealing joints J. The use of the second joint J in the hole 74 facilitates the repair or the adjustment of the joint J of the hole 70 since there is no important water flow through the cut during the work carried out on the joint J of the hole 70. The repair and the readjustment of the joint J of the hole 70 indeed become a lot easier if they are done in steady water, that is without flow or current.

Also, if the sealing joint J of the hole 70 becomes defective, we can simply proceed to inflating the supplemental joint J of the hole 74 by pressurization for ensuring the tightness of the expansion joint E, which eliminates the necessity of immediately repairing the joint J of the hole 70.

FIG. 1A illustrates another lower ending of the sealing joint J. More particularly, a pulley 96 is rotatably mounted to the lower ferrule 20, and a cable 98 is engaged around the pulley 96 and then comes up vertically on each side of the cell 10. The pulley 96 and the cable 98 replace the guide rods 60 used for the installation of the sealing joint J. The cable 98 passes through the guide rings 44 and comes out above the dam B. The sealing joint J is lowered in the hole 70 by being suspended by the cable 98. Once the installation completed, the cable 98 can be removed by pulling on one of its end, or it can be retained in place in the hole 70 for the possible future readjustment of the joint J or for its replacement. If the cable 98 is removed from the sealing joint J, the subsequent removal thereof from its hole 70 can be carried out with the use of the guide rods 60.

With reference to FIGS. 8 to 15, the guiding device in accordance with the present invention for overlapping borings which are parallel in relation to one another can assume various shapes depending on the position of the hole which must be bored with respect to the two holes already bored and for which the verticality has already been established. Generally, the guiding device ensures the connection using bearings between a sliding guide in one or more existing holes and a boring bit. This allows for a hole to be bored parallelly to one or more existing holes. By repeating the same operations, a cut can be produced. The guides have shapes and dimensions appropriate for sliding in the existing hole(s). For instance, in FIG. 8, the boring of hole 72 is carried out between the holes 64 and 66 previously bored using the controlled verticality boring apparatus, these holes serving as guides. As the boring device is located between the two guide holes 64 and 66, the guiding device will be of the type "G-B-G", wherein "G" indicates a guide and "B" indicates a boring; consequently, "G-B-G" indicates the boring of a hole between two existing and vertical holes which serve as guides in view of ensuring the verticality of the new hole and ensuring that the three holes have longitudinal axes located in the same vertical plane. As the three holes 64, 66 and 72 are all of a same diameter of four inches, the guiding device required for boring the hole 72 using as guides the holes 64 and 68 will be of the type "G4-B4-G4" wherein the numerals indicate the diameters of the respective guide holes and of the hole to be bored.

In FIG. 8, the two guiding devices "G4-B4-G4" which are each identified by the reference numeral 100 are disposed in a vertically spaced relationship one above the other and are joined by adjustment rods 102 which are screwed to the guiding devices 100 in order to allow their adjustment for ensuring that the two guiding devices 100 are parallel one with respect to the other. A boring device generally indicated by F is rotatably mounted to the guiding devices 100 with bearings 104 for ensuring to the guiding devices 100 a purely translational movement downwardly along the guide holes 64 and 66 while the boring device F displaces downwards while rotating for excavating the hole 72. The boring device F comprises the following standard parts: a rod train or a string of drill pipes 106, a reaming sleeve 108, a core barrel 110 and a core drilling crown 112. One of the adjustment rods 102 is provided with flexible guides 114 for avoiding the wedging of the boring device F. Each flexible guide 114 has the shape of a horizontal disk of a diameter slightly inferior to that of the hole 66 of FIG. 8.

Figure 9:
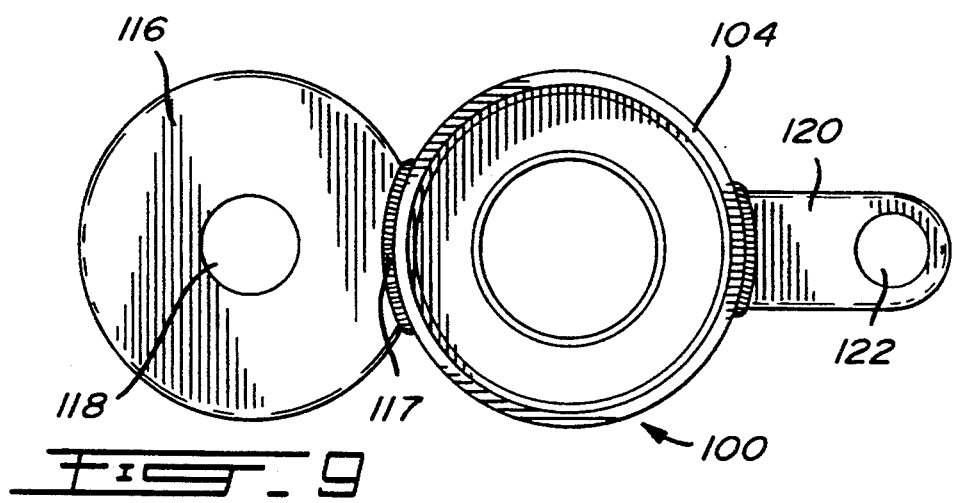
FIG. 9 is a plan view of the guiding device of FIG. 8.

FIG. 9 illustrates a guiding device 100 which comprises the forced assembly bearing 104, a guide disk 116 of a diameter almost identical to the guide hole 64 and provided with an opening 118 for receiving the adjustment rod 102, and an extension 120 intended for the guide hole 66 and also provided with an opening 122 for receiving the other adjustment rod 102. A connecting member 117 joins the forced assembly bearing 104 to the guide disk 116. This connecting member 117 has a width slightly inferior to the overlap of the holes 64 and 72. In a similar way, the width of the extension 120 corresponds to the overlap of the holes 72 and 66. The guide disk 116 and the extension 120 ensure the vertical lowering of the boring device F, preventing the latter from following an helix-shaped movement that the boring activity would encourage. Such a behavior would prevent the obtention of a hole parallel to two others and disposed in a same vertical plane. It is understood that the guide disk 116 ensures the verticality of the new hole bored by the boring device F whereas the extension 120 ensures that the three holes have coplanar longitudinal axis. Indeed, the extension 120 and the flexible guide 114 allow a play between the holes which are obviously not perfectly parallel; also, they prevent the spiral movement of the boring device F. The rubber of the flexible guide 114 prevents the wedging of the boring device F as it has a behavior similar to that of a chimney cleaning brush since it follows the walls of the hole while deflecting on its periphery against the direction of the movement of the boring device F.

It is noted that the replacement of the extension 120 with a second guide disk identical to the guide disk 116 (and, consequently, of a diameter similar to that of the guide hole 66) would offer to the guiding device 100 a structure which would be too rigid, which would result in the failure of the latter and/or maybe the failure of the boring device F. The widths of the connecting member 117 and of the extension 120 ensure the alignment of the holes 64, 66 and 72 as they offer little play with respect to the width of their respective overlap. Also, the replacement of the guide disk 116 by an extension similar to extension 120 would result in that the boring device F could exert too much pressure on the edges defined by the overlaps of the involved holes.

Figure 10:
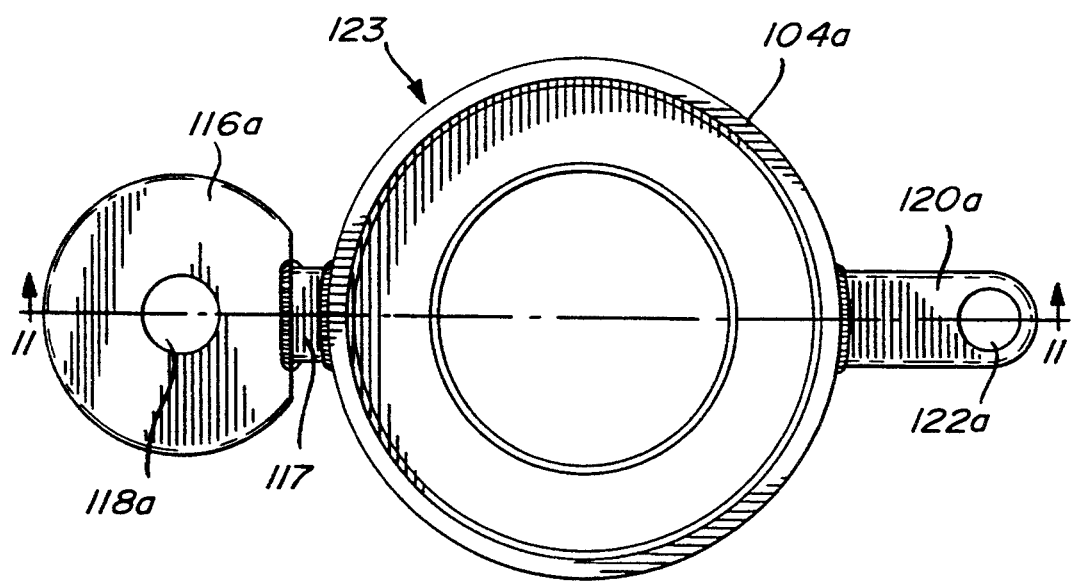
FIG. 10 is a plan view of another construction of a guiding device for overlapping and parallel borings in accordance with the present invention.
Figure 11:
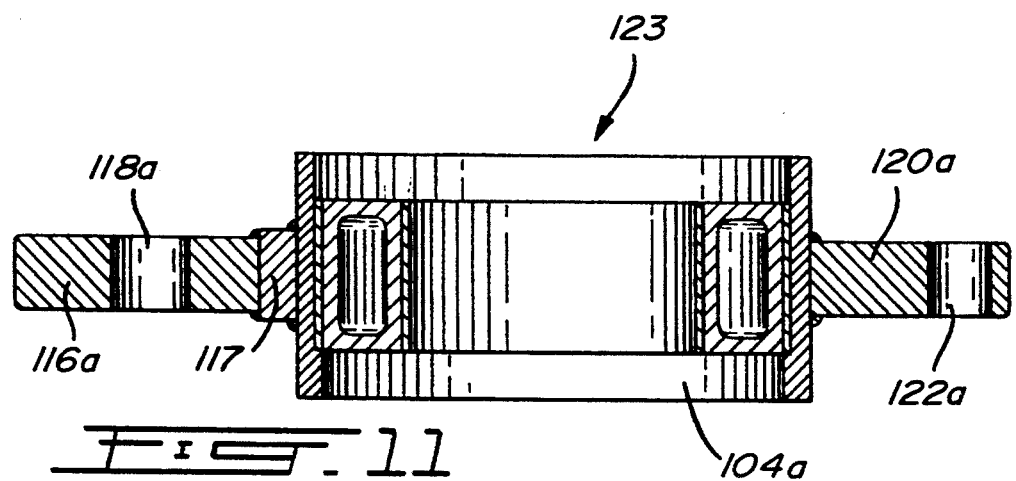
FIG. 11 is a cross-sectional view taken along lines 11—11 of FIG. 10.

FIGS. 10 and 11 illustrate a guiding device 123 of the type "G4-B8-G4" which is used for boring an eight-inch diameter hole between two guide holes each having a diameter of four inches. This type of device is used for boring the holes 70 and 74 (which receive the sealing joints J) between the holes 62 and 64, and 66 and 68, respectively. In this case, an adaptor 124 as illustrated in FIG. 12 is used for rotatably mounting the guiding device "G4-B8-G4" to the boring device F. The adaptor 124 comprises amongst others a bearing 126 and a retaining ring 128.

FIGS. 13 and 14 illustrate a guiding device 130 of the type "B4-G4-G8" which is used, when the two guide holes overlap each other, to bore a third vertical hole overlapping one of the two guide holes. The guiding device 130 is used for boring the hole 76 of FIGS. 5 and 6 which has a diameter of four inches, the guide holes being the holes 62 and 70 having diameters respectively of four and eight inches.

FIG. 15 illustrates a guiding device 132 of the type "B4-G4-G4" which is also used when the two guide holes overlap each other for boring a third vertical hole overlapping one of the two guide holes. The guiding device 132 is used for boring the holes 78 and 80 of FIGS. 5 and 6 which each have a diameter of four inches. The guide holes for the hole 78 to bore are holes 76 and 62, whereas for hole 80, the guide holes are holes 78 and 76, all of these holes having a diameter of four inches.

It is also foreseen to bore a hole along a joint, the hole being intended to receive a sealing joint J as described hereinbefore, in which is used a guiding device similar to the guiding device 100, but wherein the guide disk 116 and the extension 120 are replaced by small plates which follow the shape of the joint on which it is desired to drill the hole for receiving the sealing joint J.

Therefore, a flexible expansion joint has been produced to react to movements of a concrete dam which are in the order of approximately 0,5 inch per year. The joint will absorb or will compensate for the relative movements of the various sections of the dam. Indeed, to correct abnormalities in the behavior of the dams, it is sometimes necessary to define cuts therein. The present device ensures the sealing of these cuts and will follow the subsequent deformations of the dams. The device comprises two cells made of a reinforced elastic material inserted in pre-bored holes along the plane of the cut. For pressurizing the cells, they are filled with a liquid (non freezing is required) and an additional gas pressure is maintained therein.

The verticality of the holes and of the sealing joint must be ensured; also, the sealing joint cannot be twisted during its installation.

The guiding device for overlapping borings which are parallel in relation to one another has been developed for the installation of the sealing cells, when dams are cut. On the other hand, the same device can be used for all other cuts made by borings.

The sealing joint J in accordance with the present invention can also be used in other applications involving concrete works and even in works made of other rigid materials, such as stone, metallic structures, etc. The use of the present sealing joint J is also contemplated for concrete industrial buildings where there is a relative movement between, for instance, two walls thereof which are in contact. Also, the joint J could be set up in oil recovery tanks which sustain stresses due, for instance, to the ground in view of resolving the environmental problems which can be caused by an oil leak in the ground. In the case of products such as oil and gasoline, the cell would have to be constructed of another material than rubber, in view of the fact that rubber would be attacked by these substances. The cell could be constructed of a synthetic material, or the rubber cell could be covered with a protective coating.

The sealing joint J could also be used for repair works, temporary or permanent. For example, during the injection of grout or liquid filling in a cut of a dam, the grout of cement or other which has been injected frequently leaks through the cut itself on the downstream and upstream sides of the dam before it can solidify. Consequently, a temporary plugging structure is easily installed downstream of the cut to prevent the grout from running. However, it is difficult to seal the upstream side of the cut because of the presence of water. Therefore, next to the upstream end of the cut, we can install the present sealing joint in the cut to close the cut and thus prevent the subsequently injected grout to flow out of the cut. Once the grout is sufficiently set for preventing the same from running out of the cut of the dam, the sealing joint can be removed having been previously coated with an adequate lubricant to facilitate the withdrawal thereof.

It is also contemplated to use the present sealing joint for sealing an expansion joint already foreseen during the construction of the concrete work. More particularly, a recovery tank, for instance, could be coffered in a way to define cuts on two of its walls. During the coffering, a hole would be defined on each of the cuts. A cardboard tube could be installed in each hole and could be subsequently removed therefrom before the installation of the sealing joint. The installation of the sealing joint in the hole of each of the expansion joints would seal the tank and would allow the same to move in the course of the years without breaking.

We claim:

1. A sealing device for sealing an opening defined in a concrete work comprising a cell made of an elastic material and including at least one tubular section, said cell being provided at upper and lower ends thereof respectively with rigid upper and lower end members, a lower surface of said lower end member being shaped for facilitating the insertion of the sealing device in a hole defined in the opening, substantially unextensible means mounted between said upper and lower end members for preventing the longitudinal stretching of said cell, said cell including reinforcement means spaced one from the other and adapted to be disposed opposite the opening for preventing the deformation of said cell in the opening, a continuous peripheral space being defined on said cell between the lower ends of said reinforcement means and the upper end of said lower end member, and means for allowing the positioning and the installation of the sealing device.

2. A sealing device as defined in claim 1, wherein said upper and lower end members each comprise at least one cylindrical section, said cell defining a cylinder fixedly covering at said upper and lower ends thereof the respective cylindrical sections of said upper and lower end members.

3. A sealing device as defined in claim 2, wherein said cylindrical sections of said upper and lower end members each define anchoring teeth on their respective periphery which engage respectively said upper and lower ends of said cylindrical cell for ensuring the assembly thereof, retaining collars being mounted around said upper and lower ends of said cell for reinforcing said assembly.

4. A sealing device as defined in claim 2, wherein said lower end member comprises a semispherical section at a lower end of said cylindrical section thereof.

5. A sealing device as defined in claim 1, wherein said unextensible means comprise at least one cable mounted taut in said cell, the ends of each cable being fixed at a respective end member by way of attachment means.

6. A sealing device as defined in claim 5, wherein said attachment means comprise eye-bolts.

7. A sealing device as defined in claim 2, wherein said upper end member comprises a retaining ring defining a threaded central opening receiving a plug, said plug including an opening connected to a tubulure which comprises a valve for allowing the supply of at least one fluid in said cell and ensuring that the desired fluid pressure is maintained in said cell.

8. A sealing device as defined in claim 1, wherein said cell is made of a rubber material.

9. A sealing device as defined in claim 1, wherein said upper end member comprises means for the handling of said sealing device and for the fixing thereof to the work.

10. A sealing device as defined in claim 1, wherein said reinforcement means comprise two longitudinal reinforcements disposed exteriorly on one side and the other of said cell.

11. A sealing device as defined in claim 10, wherein said reinforcements are made of a rigid material and are adhesively mounted on said cell.

12. A sealing device as defined in claim 10, wherein said means for allowing the positioning and the installation of said sealing device comprise guide rings disposed exteriorly along each of said reinforcements and engaging the opening of the work, a pulley vertically mounted at the bottom of said lower end member, and a cable engaging said pulley and coming back up onto opposite sides of said cell while going through respective guide rings of said two reinforcements.

13. A sealing device as defined in claim 12, wherein said guide rings each have an arched base disposed between said cell and a respective reinforcement.

14. A sealing device as defined in claim 10, wherein said means for allowing the positioning and the installation of said sealing device comprise guide rings disposed along each reinforcement and engaging the opening of the work, at least one guide rod extending through respective guide rings of one of said two reinforcements and including a threaded lower end, a guiding coupling sleeve mounted at the bottom of the reinforcement and defining a threaded central opening for receiving a respective guide rod.

15. A sealing device as defined in claim 14, wherein said guide rings each have an arched base disposed between said cell and a respective reinforcement, a guide rod being provided for the guide rings of each of said two reinforcements.

16. A method for installing an expansion joint in a concrete work with a sealing device which comprises a tubular and elastic cell provided at upper and lower ends thereof respectively with rigid upper and lower end members, a lower surface of said lower end member being shaped for facilitating the insertion of said sealing device in the concrete work, substantially unextensible means mounted between said upper and lower end members, said cell including reinforcement means spaced one from the other, a continuous peripheral space being defined on said cell between the lower ends of said reinforcement means and the upper end of said lower end member, the method including the following steps:
  a) boring a first hole in the work intended for receiving said sealing device;
  b) installing said sealing device in the first hole, said reinforcement means being positioned in the direction of the flow;
  c) filling under required pressure said cell with at least one appropriate fluid; and
  d) completing the expansion joint by cutting the work in the direction of the flow and opposite said reinforcement means, the cut communicating with the first hole and thus with said sealing device and extending to a depth substantially corresponding to the lower ends of said reinforcement means so that the section of said cell located between said reinforcement means and said lower end member contacts along its periphery the walls of the first hole.

17. A method for installing an expansion Joint in a concrete dam with a sealing device which comprises a tubular and elastic cell provided at upper and lower extremities thereof respectively with rigid and lower end members, a lower surface of said lower end member being shaped for facilitating the insertion of said sealing device in the dam, substantially unextensible means mounted between said upper and lower end members, said cell including reinforcement means spaced one from the other, a continuous peripheral space being defined on said cell between the lower ends of said reinforcement means and the upper end of said lower end member, the method including the following steps:
  a) boring a first hole in the dam intended for receiving said sealing device;
  b) installing said sealing device in the first hole, said reinforcement means being positioned in the direction of the water flow;
  c) filling under required pressure said cell with at least one appropriate fluid; and
  d) completing the expansion joint by the cutting of the dam in the direction of the water flow and opposite said reinforcement means, the cut communicating with the first hole and thus with said sealing device and extending to a depth substantially corresponding to the lower ends of said reinforcement means so that the section of said cell located between said reinforcement means and said lower end member contacts along its periphery the walls of the first hole.

18. A method as defined in claim 17, wherein said cell has a cylindrical shape and said unextensible means comprise at least one cable mounted taut in said cell, the ends of each cable being fixed to a respective end member.

19. A method as defined in claim 18, comprising before step b) the step of boring a second and a third hole with an overlap on each side of the first hole for facilitating steps b) and d).

20. A method as defined in claim 19, comprising before step b) the step of boring a fourth hole, this fourth hole being intended for receiving a second sealing device similar to that of the first hole, and further comprising, in step d), causing the cut which completes the expansion joint to also reach the fourth hole.

21. A method as defined in claim 20, comprising the step of installing a second sealing device in the fourth hole and then filling said second sealing device with an appropriate fluid.

22. A method as defined in claim 21, wherein said second sealing device is filled under required pressure with at least one appropriate fluid.

23. A method as defined in claim 19, wherein said sealing device comprises an installation device including guide rings disposed exteriorly along each of said reinforcement means, a pulley being mounted vertically at the bottom of said lower end member, and a cable engaging said pulley and coming back up on each side of said cell while passing through respective guide rings of said reinforcement means, the method comprising, in step b), the step of introducing said guide rings in the second and third holes.

24. A method as defined in claim 19, wherein said sealing device comprises an installation device including guide rings disposed exteriorly along each of said reinforcement means, at least one guide rod passing through respective guide rings of one of said reinforcement means and including a threaded lower end, a guiding coupling sleeve mounted at the bottom of the reinforcement means and defining a threaded central opening receiving a respective guide rod, the method comprising, in step b), the step of introducing the guide rod and the guide rings associated therewith in one of the second and third holes, attaching said sealing device to the dam, then unscrewing the guide rod from the guiding coupling sleeve, and finally withdrawing the guide rod from its hole.

25. A method as defined in claim 24, wherein a guide rod is used for each of the second and third holes, each guide rod being associated with one of said reinforcement means.

26. A method for the readjustment of a sealing device of an expansion joint cut in a concrete dam, said sealing device comprising a tubular and elastic cell provided at upper and lower ends thereof respectively with rigid upper and lower end members, a bottom surface of said lower end member being shaped for facilitating the insertion of said sealing device in the dam, substantially unextensible means mounted between said upper and lower end members, said cell including reinforcement means spaced one from another, a continuous peripheral space being defined on said cell between the lower ends of said reinforcement means and the upper end of said lower end member, said sealing device being installed in a first hole defined in the concrete dam on the expansion joint, said reinforcement means being positioned in the direction of the flow of water, said cell being pressurized with at least one appropriate fluid, a second sealing device, similar to the sealing device of the first hole, being installed in a second hole also defined on the expansion joint, the method including the following steps:
   a) pressurizing the second sealing device under required pressure with at least one appropriate fluid;
   b) pressurizing at least partly the sealing device of the first hole in such a way as to eliminate the adherence thereof with the walls of the first hole and for allowing this sealing device to recover its position in the first hole; and
   c) pressurizing the sealing device of the first hole.

27. A method for the readjustment of a sealing device of an expansion joint cut in a concrete dam, said sealing device comprising a tubular and elastic cell provided at upper and lower ends thereof respectively with rigid upper and lower end members, a bottom surface of said lower end member being shaped for facilitating the insertion of said sealing device in the dam, substantially unextensible means mounted between said upper and lower end members, said cell including reinforcement means spaced one from another, a continuous peripheral space being defined on said cell between the lower ends of said reinforcement means and the upper end of said lower end member, said sealing device being installed in a first hole defined in the concrete dam on the expansion joint, said reinforcement means being positioned in the direction of the flow of water, said cell being pressurized with at least one appropriate fluid, the method including the following steps:
   a) boring a second hole in the expansion joint intended for receiving a second sealing device similar to the sealing device of the first hole;
   b) installing said second sealing device in the second hole;
   c) filling said second sealing device under required pressure with at least one appropriate fluid;
   d) depressurizing at least partly the sealing device of the first hole in such a way as to eliminate the adherence thereof with the walls of the first hole and for allowing this sealing device to recover its position in the first hole; and
   e) pressurizing the sealing device of the first hole.

28. A readjustment method as defined in claim 27, wherein step f) consists of depressurizing said second sealing device.

29. A method for the replacement of a sealing device of an expansion joint cut in a concrete dam, said sealing device comprising a tubular and elastic cell provided at upper and lower ends thereof respectively with rigid upper and lower end members, a bottom surface of said lower end member being shaped for facilitating the insertion of said sealing device in the dam, substantially unextensible means mounted between said upper and lower end members, said cell including reinforcement means spaced one from another, a continuous peripheral space being defined on said cell between the lower ends of said reinforcement means and the upper end of said lower end member, said sealing device being installed in a first hole defined in the concrete dam on the expansion joint, said reinforcement means being positioned in the direction of the flow of water, said cell being pressurized with at least one appropriate fluid, a second sealing device, similar to the sealing device of the first hole, being installed in second hole also defined on the expansion joint, the method including the following
   a) pressurizing the second sealing device under required pressure with at least one appropriate fluid;
   b) depressurizing the sealing device of the first hole;
   c) emptying the fluid contained in the sealing device of the first hole and withdrawing said sealing device from the first hole; and
   d) installing a new sealing device in the first hole, its subsequent filling with least one appropriate fluid, and pressurizing the new sealing device of the first hole.

30. A method for the readjustment of a sealing device of an expansion joint cut in a concrete dam, said sealing device comprising a tubular and elastic call provided at upper and lower ends thereof respectively with rigid upper and lower end members, a bottom surface of said lower end member being shaped for facilitating the insertion of said sealing device in the dam, substantially unextensible means mounted between said upper and lower end members, said cell including reinforcement means spaced one from another, a continuous peripheral space being defined on said cell between the lower ends of said reinforcement means and the upper end of said lower end member, said sealing device being installed in a first hole defined in the concrete dam on the expansion joint, said reinforcement means being positioned in the direction of the flow of water, said cell being pressurized with at least one appropriate fluid, the method including the following steps:
   a) boring a second hole on the expansion joint intended for receiving a second sealing device similar to the sealing device of the first hole;
   b) installing said second sealing device in the second hole;
   c) filling said second sealing device under required pressure with at least one appropriate fluid;
   d) depressurizing the sealing device of the first hole;

e) emptying the fluid contained in the sealing device of the first hole and withdrawing said sealing device from the first hole; and f) installing a new sealing device in the first hole, its subsequent filling with at least one appropriate fluid, and pressurizing the new sealing device of the first hole.

31. A replacement method as defined in claim 30, wherein step g) consists of depressurizing said second sealing device.

32. A method for impermeabilizing an opening in a concrete work with a sealing device which comprises an elastic and tubular cell provided at upper and lower extremities thereof respectively with rigid upper and lower end members, a lower surface of said lower end member being shaped for facilitating the insertion of said sealing device in the work, substantially unextensible means mounted between said upper and lower end members, the method comprising the following steps:

a) boring a first hole in the opening of the work, the hole being intended to receive said sealing device;

b) installing said sealing device in the first hole; and c) filling under required pressure said cell with at least one appropriate fluid.

33. An impermeabilization method as defined in claim 32, wherein said cell includes reinforcement means spaced one from another, a continuous peripheral space being defined on said cell between the lower ends of said reinforcement means and the upper end of said lower end member.

34. An impermeabilization method as defined in claim 33, wherein said cell is cylindrical, said unextensible means including at least one cable connected at extremities thereof to said upper and lower end members.

35. An impermeabilization method as defined in claim 34, comprising, before step b), the step of boring a second and a third hole in the opening with an overlap on one side and the other of the first hole and parallelly to the first hole for facilitating step b), and comprising, in step b), the step of positioning said reinforcement means opposite the overlaps of the first hole with the second and third holes.

36. An impermeabilization method as defined in claim 35, wherein said sealing device comprises an installation device including guide rings disposed along each of said reinforcement means, a pulley being vertically mounted at the bottom of said lower end member, and a cable being engaged on said pulley and coming back up on each side of said cell while passing through respective guide rings of said reinforcement means, the method comprising, in step b), the step of inserting said guide rings in the second and third holes.

37. An impermeabilization method as defined in claim 36, comprising, in step c), the step of removing said cable of said installation device from the first hole.

38. An impermeabilization method as defined in claim 35, wherein said sealing device comprises an installation device including guide rings disposed along each of said reinforcement means, at least one guide rod passing through respective guide rings of one of said reinforcement means and including a threaded lower end, a guiding coupling sleeve mounted at the bottom of each reinforcement means and defining a threaded central opening receiving a respective guide rod, the method comprising, in step b), inserting said guide rods and said guide rings in the second and third holes, and, in steps b) or c), unscrewing said guide rods from said guiding coupling sleeves, and removing said guide rods from the second and third holes.

39. An impermeabilization method as defined in claim 38, wherein a guide rod is provided for the guide rings of each of said reinforcement means.

40. A method for filling an opening in a rigid work, the opening offering a preferential path preventing a filling material from staying in the opening, the method using a temporary sealing device which comprises an elastic and tubular cell provided at upper and lower ends thereof respectively with rigid upper and lower end members, a lower surface of said lower end member being shaped for facilitating the insertion of said sealing device in the work, substantially unextensible means mounted between said upper and lower end members, the method including the following steps:

a) boring a first hole in the opening at a location where the installation of said sealing device in the first hole will close the preferential path of the filling material;

b) installing said sealing device in the first hole;

c) filling said cell under required pressure with at least one appropriate fluid; and d) filling the opening exteriorly of said sealing device with the filling material.

41. A method as defined in claim 40, wherein step e) consists of withdrawing said sealing device from the first hole, once the filling material has sufficiently set in the opening.

42. A method as defined in claim 40, wherein said cell includes longitudinal reinforcement means spaced one from another, and the method further comprising, before step b), the step of boring a second and a third hole with an overlap on one side and the other of the first hole and parallelly thereto for facilitating step b), said reinforcement means being positioned opposite the opening.

43. A method for installing a sealing device in an expansion joint previously formed in a concrete work, a first hole having been previously defined in the expansion joint deeper than cut of the expansion joint for receiving eventually the sealing device, said sealing device comprising a tubular and relatively elastic and resistant cell, said cell being provided at upper and lower ends thereof respectively with rigid upper and lower end members, a lower surface of said lower end member being shaped for facilitating the insertion of said sealing device in the work, substantially unextensible means mounted between said upper and lower end members, the method comprising the following steps:

a) installing said sealing device in the first hole so as to extend lower than said cut; and b) filling under required pressure said cell with at least one appropriate fluid.

* * * * *